United States Patent [19]
Granger

[11] Patent Number: 5,794,910
[45] Date of Patent: Aug. 18, 1998

[54] SIGN POST WITH BREAKAWAY SPLICE

[76] Inventor: Mark S. Granger, 285 Longfellow Ave., Worthington, Ohio 43085

[21] Appl. No.: 626,126

[22] Filed: Apr. 1, 1996

[51] Int. Cl.⁶ .................................................. E01F 9/018
[52] U.S. Cl. .......................... 248/548; 52/98; 248/900; 403/2
[58] Field of Search ................................ 52/165, 169.9, 52/98; 248/548, 900; 404/10; 403/2

[56]                References Cited

U.S. PATENT DOCUMENTS

| 2,449,056 | 9/1948  | Clark          | 304/37  |
| 3,900,269 | 8/1975  | Pavlot         | 403/292 |
| 4,126,403 | 11/1978 | Sweeney et al. | 403/2   |
| 4,435,106 | 3/1984  | Forster et al. | 404/6   |
| 4,490,062 | 12/1984 | Chisholm       | 403/2   |
| 4,858,876 | 8/1989  | Moreno         | 248/545 |
| 4,926,592 | 5/1990  | Nehls          | 52/98   |
| 4,928,446 | 5/1990  | Alexander, Sr. | 52/98   |
| 5,004,366 | 4/1991  | Simmons        | 403/2   |
| 5,066,163 | 11/1991 | Whitaker       | 404/10  |
| 5,088,683 | 2/1992  | Briden         | 248/548 |
| 5,090,348 | 2/1992  | Hugron         | 116/63  |
| 5,165,818 | 11/1992 | Newhart        | 404/10  |
| 5,205,236 | 4/1993  | Hughes         | 116/63  |
| 5,214,886 | 6/1993  | Hugron         | 52/98   |
| 5,273,371 | 12/1993 | Hugron         | 404/10  |
| 5,480,121 | 1/1996  | Rice et al.    | 403/2   |

*Primary Examiner*—Michael Safavi
*Attorney, Agent, or Firm*—Mueller and Smith, LPA

[57]                ABSTRACT

A sign post is formed of a lower support component for anchoring within terrain, leaving an exposed upper portion above the surface of such terrain. The support component includes an array of longitudinally regularly spaced apertures. An upper support component formed having the same cross-sectional configuration and regularly spaced apertures is attached to the lower component at the exposed portion through the utilization of a splicing technique. The splice is formed as a stress transfer bar having two strategically positioned bores therein. These bores are spaced apart longitudinally a distance representing an even integer of the upper and lower component aperture spacing. Breakaway bolts are positioned through one of the components and into and through the stress transfer bar, and then the second component is attached with nuts being positioned and tightened over the bolts as they extend through the stress transfer bar. This assures that the bolts will be properly longitudinally spaced such that the sign will properly break away when struck by an errant motor vehicle, but the sign will withstand requisite wind loadings.

3 Claims, 2 Drawing Sheets

SIGN POST WITH BREAKAWAY SPLICE

BACKGROUND

Signage employed with roadway systems has been the subject of regulatory and institutional investigation essentially since the emergence of the motor vehicle. The structural characteristics of road or highway signs vary from major bridging entities to the relatively small and ubiquitous stop sign. Regulations and specifications promulgated for signage extend not only to a standardization of their visual cuing aspects, but also to vehicular safety considerations. For example, the Federal Highway Administration evaluates sign structures for conformance with the AASHTO (American Association of State Highway Transportation Officials) "Standard Specifications for Structural Supports for Highway Signs, Luminaires, and Traffic Signals", as well as the NCHRP (National Cooperative Highway Research Program) Report 350 entitled "Recommended Procedures for Safety Performance Evaluation of Highway Features".

The mounting or supporting structures for stop signs and the like, generally are categorized as "small sign supports". Traditionally, the designs for these small supports have been based upon two considerations. First, their mounting should be sufficiently robust to withstand torsional and other stresses associated with wind loads. When typically mounted upon single sign posts, stop signs and the like become airfoils to wind loads with resultant induced torsional and other stresses. A traffic control sign such as a stop sign can pose serious hazards when blown down by virtue of its cuing absence. Secondly, it is reasonably anticipated that such signs will be struck in the course of roadway accidents. Accordingly, they must be designed to break away under specified impact conditions such that they present no danger to vehicle occupants. For example, as an errant vehicle strikes a signpost, the post should break away such that no part of it penetrates the passenger compartment and no passengers experience a negative change in relative velocity greater than 5 meters per second. To assure appropriate breakaway characteristics, many signposts are provided having two components. A first lower support or anchoring component is provided which is driven or otherwise secured in the ground with a small portion of it, for example about 4 inches, protruding from terrain surface. Then, an elongate upper component carrying the sign at one end is attached to the protruding portion of the lower component using a splice form of connection and connectors or fasteners having a breakaway characteristic such as break away bolts which fail under predetermined tensile stresses. Fortuitously, certain of the signposts also are observed to break additionally at the point of impact with a vehicle.

Signpost structures may take on a variety of cross-sectional configurations and generally are formed of steels which may exhibit a variety of characteristics. The cross-sectional configurations may, for example, be round or pipe-like, or very often are formed as flanged channels having a cross-sectional shape somewhat emulating a hat. Steel forming such posts generally exhibits a brittleness, and the completed post structures particularly are subject to failure in wind load induced torsion. In order to provide a splicing interconnection between the two signpost components adequate to overcome wind loads, it is necessary that the two post configurations abut or nest together and that they be fastened by break away bolts which are spaced an adequate distance apart, typically four inches. Generally, the posts will be formed having a spaced apart apertures along their central lengths which field personnel align and then install breakaway bolts at specified vertical spacings. A difficulty earlier has been identified in connection with the splicing together of nested channel-formed signpost components. In this regard, the component cross-sectional configurations often do not nest. When this occurs, the breakaway bolts may be subjected to excessive moment induced stresses to cause premature failure of the signs under wind load. Granger addressed this problem in an approach described in U.S. Pat. No. 5,125,194 entitled "Safety Signpost with Break Away Connection", issued Jun. 30, 1992. With the early Granger approach, field personnel were called upon to install spacers between the channel sections such that the contact surfaces of the channel sections were brought together against the spacer notwithstanding their failure to otherwise nest. To provide such correction procedures, field personnel are trained and provided with written and diagrammatic instructions as to the use of the spacers and requisite splice spacing of the break away bolts.

In practice, however, it has been observed that such procedures often are not followed, due in part to the physical difficulties encountered by field personnel while erecting signs under even mild wind conditions. Frustrated under such circumstances, such field personnel will ignore requisite longitudinal bolt spacing and omit spacers. The result may be the subsequent loss of signage due to wind load induced torsional stress.

SUMMARY

The present invention is addressed to a signpost and the method of its erection wherein the close, mutually contacting, nesting of channel-form post components at a breakaway splice is avoided. Further, a proper spacing of breakaway bolts is assured to develop proper windload resistance and human error is minimized to the extent that fully functional splicing is achieved even when the lower, terrain inserted component of the sign post is installed backwards. These advantages are achieved through the utilization of a stress transfer bar which is designed having contact surfaces of a width which is predetermined to the extent that it is capable of nesting in stress transfer relationship with the aperture containing connecting surfaces of upper and lower sign post components. The stress transfer bar has a thickness dimension adequate to assure that the side members and flanges of U-channel type signpost components are spaced apart and thus, moment induced loadings upon breakaway bolts are eliminated. Further, the stress transfer bar is formed having two parallel fastener receiving channels which are provided, typically, as bores which are spaced apart a predetermined integer multiple of the spacing distance between the apertures on the upper and lower support components. This fixes the spacing of bolts used at the splice such that the splice will always be within specification. The breakaway bolt and stress transfer bar also enjoys the advantage of permitting a form of assembly which is much easier for field personnel. In this regard, the spaced apart bores within the stress transfer bar may be internally threaded and the stress transfer bar may be fully attached or assembled with the breakaway bolts, in a fully tightened manner with end portions of the bolt protruding as studs for receiving the opposite support component, for example the upper support component. This substantially facilitates the positioning of the upper component under wind loads and the like. As a further feature, a supervisory aspect of the sign erection function may be employed through the utilization of a preassembly, for example, of the upper component of the sign post with the stress transfer bar under controlled, in-shop conditions. The preassembly, then of the upper component with stress transfer bar can be attached to the lower component following the driving of the lower component into terrain.

Another feature and object of the invention provides a sign post which includes a lower support component for anchoring positioning below a surface of terrain and having an upper portion for extension a predetermined distance above the surface with a first connecting surface of predetermined widthwise configuration having apertures therein longitudinally spaced apart a predetermined distance. An upper support component also is provided which has an upper end for supporting connection with a sign and a lower end with a second connecting surface of second predetermined widthwise configuration having apertures therein spaced apart that same predetermined spacing distance. A stress transfer bar is provided having a widthwise extent corresponding with one predetermined first and second widthwise configuration of lesser width to define contact surfaces, spaced apart a thickness dimension effective to provide for transfer stress between the upper support component and the lower support component entirely through the stress transfer bar, each being positionable in substantially continuous stress transferring contact with one first and second connecting surface. The stress transfer bar has two parallel fastener receiving channels extending normally to the contact surfaces and spaced longitudinally apart along the length of the stress transfer bar a predetermined integer multiple of the predetermined spacing distance selected to structurally retain the upper support component upon the lower support component in the presence of wind loads upon the sign. Fasteners are provided exhibiting predetermined tensile breakaway characteristics each extending through one receiving channel for the purpose of retaining the first and second connecting surfaces in abutment against the contact surfaces.

Other objects of the invention will, in part, be obvious and will, in part, appear hereinafter. The invention, accordingly, comprises the apparatus and method possessing the construction, combination of elements, arrangement of parts, and steps which are exemplified in the following detailed disclosure.

For a fuller understanding of the nature and objects of the invention, reference should be had to the following detailed description taken in connection with the accompanying drawings.

DETAILED DESCRIPTION

Figure 1:
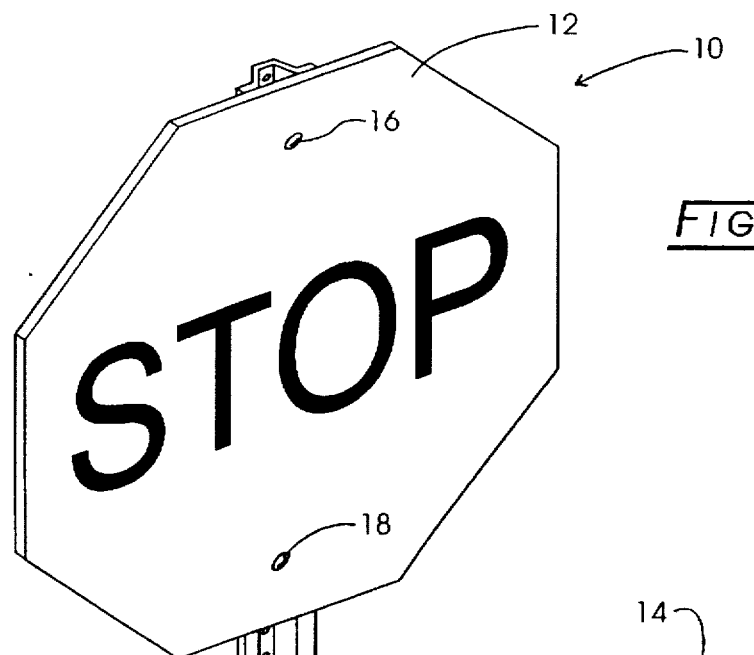
FIG. 1 is a perspective view of the sign post of the invention showing it with a break-away splice as installed upon terrain.

Referring to FIG. 1, a small sign installation is represented generally at 10.

Figure 2:
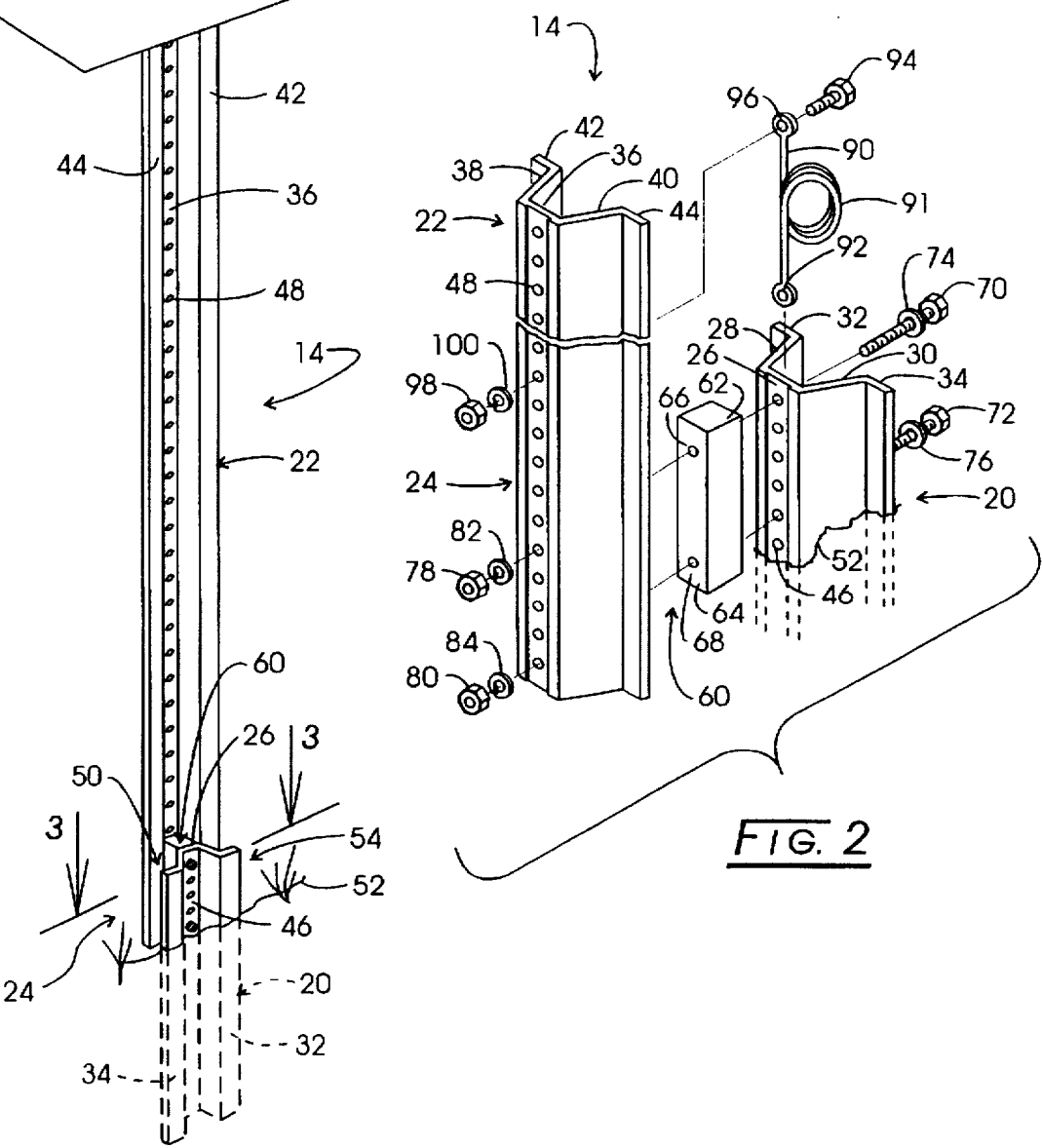
FIG. 2 is a partial exploded view of the sign post of FIG. 1 taken at the splice region thereof.

Installation 10 is shown comprised of a visual cuing sign, carrying letters spelling out the word "stop" within a mandated octagonal periphery. Sign 12 is attached to a sign post represented generally at 14 by two bolts 16 and 18. Sign post 14 is formed with two components, a lower support component or stub post 20, and an elongate upper support component 22 which are joined at a breakaway splice represented generally at 24. The cross section depicted for components 20 and 22 is of the earlier-noted U-channel or flanged channel variety. For the case of lower sup connecting surface 26 as seen in FIG. 2 is established at its central region. The cross section also includes two angularly outwardly disposed sidewalls 28 and 30 from which outwardly extend respective flanges 32 and 34. Upper support component 22 is identically structured having a connecting surface 36 located intermediate and angularly disposed sidewalls 38 and 40. Sidewalls 38 and 40 are integrally formed with outwardly disposed flanges shown, respectively, at 42 and 44. The lengthwise extents of connecting surfaces 26 and 36 are formed having regularly spaced, linearly and longitudinally aligned apertures or holes, certain of which are represented, respectively, at 46 and 48. This predetermined spacing may, for example, be at one inch centers.

In general, the steel from which components 20 and 22 are formed is a stock steel channel material having a high carbon content so as to be relatively brittle. The lower and upper channel sections 20 and 22 are made of material with a yield stress of 80–100 ksi, generally conforming to ASTM A499 (re-roll rail steel), but made from new billets. Lower component 32 typically will extend about 3½ feet into the ground or terrain, and protrude, for example, about 4 inches thereabove at its upper end as represented at 50 in connection with the terrain representation 52. FIG. 1 further reveals that the splice 24 is provided through the union of the upper portion 50 of lower support component 20 with the lower end 54 of upper support component 22, the sign 12 being coupled at the upper end of component 22.

Accommodation for the moment-based overloading of fasteners occasioned by a lack of nesting of U-channel post components as at 20 and 22, as well as to inherently assure that proper fastener-to-fastener spacing, for example 4 inches, is achieved in erecting the signs through utilization of a stress transfer spacing approach. In this regard, a stress transfer bar represented generally at 60 is employed at the breakaway splice 24. Additionally, the device 60 will be seen to facilitate field assembly. For example, the field worker is not required to undertake the awkward procedures of the past, i.e. insert a bolt and washer through one post component, then provide a spacer and then while supporting that sub-assembly and holding the upper component of the sign post with sign attached in one hand, inserting the bolt assembly through a next aperture in the second component. That procedure generally has led to the frustration leading to improper bolt spacing and the like. Stress transfer bar 60, for example is formed of cold rolled steel, having a length of about 6 inches, and a square cross section, for example, of about ¾ inch×¾ inch. The particular width of the transfer bar 60 is selected as corresponding with the lesser width of connecting surface 26 or connecting surface 36. For the illustration shown, that lesser width will be at connecting surface 26. In other applications, the two connecting surface widths will be the same. This width of the transfer bar 60 defines parallel contact surfaces 62 and 64 which extend along in substantially continuous contact with respective connecting surfaces 26 and 36. To properly position the fasteners associated with splice 24, the stress transfer bar 60 is formed having two parallel fastener receiving channels, here shown as through bores 66 and 68. Fastener receiving channels 66 and 68 are spaced apart a predetermined integer multiple of the spacing distance between 48. In particular, for the embodiment shown, where the spacing of apertures 46 and 48 is one inch center-to-center, then it is preferred that the center-to-center spacing of channels 66 and 68 be 4 inches. Also, for the embodiment shown, it is preferred that these channels or bores 66 and 68 be tapped or threaded. With such an arrangement, the fastener components provided as fully threaded break-away bolts 70 and 72 along with respectively associated washers 74 and 76 may be pre-assembled with stress transfer bar 60 with no requirement for simultaneously manipulating the upper signpost component 22. The result will be a completely fastened stress transfer bar 60 to the connecting surface 26 as a preliminary step in erecting signpost component 22. Proper spacing of the bolts 70 and 72 along the longitudinal extent of components 20 and 22 is assured by the bores 66 and 68.

Figure 3:
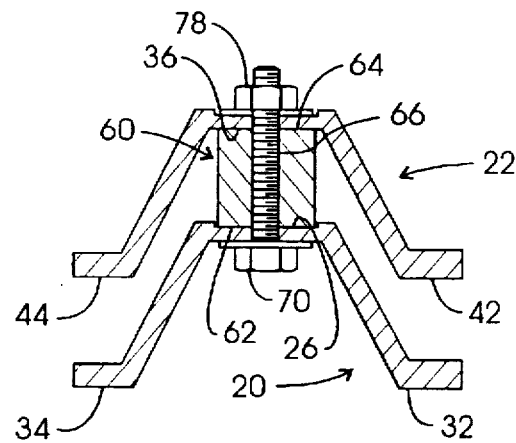
FIG. 3 is a sectional view taken through the plane 3—3 shown in FIG. 1.

With relative ease, the upper component 22 then may be moved into adjacency with the pre-assembled component 20 and stress transfer bar 60 such that the outwardly extending bolt components are received within the apertures as at 48 at proper spacing and connecting nuts as at 78 and 80 along with washers shown, respectively at 82 and 84, then may be positioned and tightened to an appropriate torque. In general, bolts 70 and 72 are provided as grade 9 steel, for example with a 5/16th inch diameter. The washers also are grade 9 steel. As seen in FIG. 3, the resultant connection provides a substantially continuous contact between connecting surface 26 and contact surface 62 as well as between connecting surface 36 and contact surface 64. This permits a transfer of stress from the component 22 carrying wind induced torsional loads and the like from sign 12. That transfer is entirely through those mated surfaces such that no spurious moment induced high loadings are imposed upon the break-away bolts 70 and 72 by windloads. Typically, washers as at 82 and 84 are provided in connection with the coupling of nuts 78 and 80. For some applications, run-away straps as at 90 (FIG. 20) may be coupled to the assembly in connection with bolt 70. In this regard, the strap 90 is connected through its aperture 92 to lower component 20 and bolt 70. A bolt 94 then is extended through aperture 96 of strap 90 and thence through an aperture or hole 48 within upper component 22 to be secured by a nut and washer combination 98 and 100. The length of strap 90 is selected for purposes of dissipating energy during a breakaway procedure, and the strap 90 functions to control injury from broken away component 22 in the event of impact with an errant motor vehicle. To provide adequate length, inter alia, for breakaway energy dissipation while retaining a conveniently installable configuration, the strap is stress looped as at 91. Loop 91 provides a coiled intermediately disposed storage portion of length selected to permit an energy dissipation but ground retention of the signpost upper component following an impact of level causing break away phenomena. Alternately, the strap may be formed of stressed wire rope. Loop retention may be developed with other tecuniques such as paraffin potting.

The embodiment of FIGS. 1–3 wherein channels or bores 66 and 68 are tapped or internally threaded and the breakaway bolts 70 and 72 are fully threaded lends itself to a pre-assembly approach wherein supervisory authority may be invoked over field personnel before the sign components 20 and 22 are permitted to leave a central location or shop. In this regard, the stress transfer bar 60 may be pre-assembled to the upper component 22 under supervision. Mounting in the field then involves merely sliding the extensions of bolts 70 and 72 as they emerge from contact surface 62 into the corresponding apertures of lower component 20. Thus upper component 22 sub-assembly is readily retained in position while nuts and washers are tightened upon the extensions of the breakaway bolts. For the sub-assembly, the nuts 70 and 72 as shown in FIG. 2 would be inserted in an opposite sense as illustrated therein.

Figure 4:
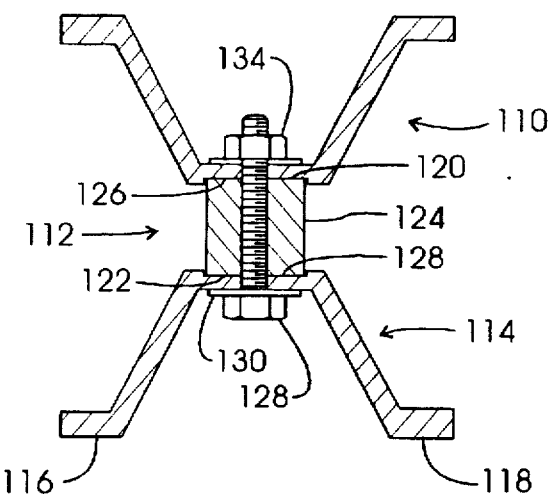
FIG. 4 is a sectional view similar to FIG. 3 but illustrating the utilization of the invention in conjunction with an improperly oriented ground-mounted lower component.

Proper mounting of signs as at 12 upon the U-channel type upper components 22 is one wherein the flange components 42 and 44 provide an additional outrigger form of support against the back of the sign. Typically, the lower components 20 are inserted in the terrain using a rig similar to a pile driver to assure verticality. Of course, they can simply be driven into the ground with a sledgehammer or the like. Instances may occur where the lower component 20 is inserted backwards. Where that is the case, the upper component 22 still can be attached to the properly oriented lower component through employment of the stress transfer bar 60 without loss of strength at the splice 24. Such an arrangement is represented in FIG. 4. Here, a lower component, shown generally at 110, having the U-channel shape may be assumed to have been inserted in the ground in a backwards or reverse sense. The splice coupling represented generally at 112 retains its full integrity. In this regard, the upper component 114 remains in its proper orientation with outrigger flanges 116 and 118 facing in an appropriate direction for supporting a sheet steel or the like sign. Earlier described connecting surface 26 is now presented at 120 and the corresponding connecting surface for upper component 114 is located on an opposite side from that earlier described at 36, being shown in FIG. 4 at 122. A stress transfer bar 124 is connected between the lower component 112 and upper component 114 such that its contact surface 126 continuously engages connecting surface 120 and its parallel and oppositely disposed contact surface 128 substantially continuously engages connecting surface 122. As before, breakaway bolts and associated washers and nuts are used to complete the splice 112, one such assembly being represented at bolt 128, washer 130, washer 132, and nut 134.

Figure 5:
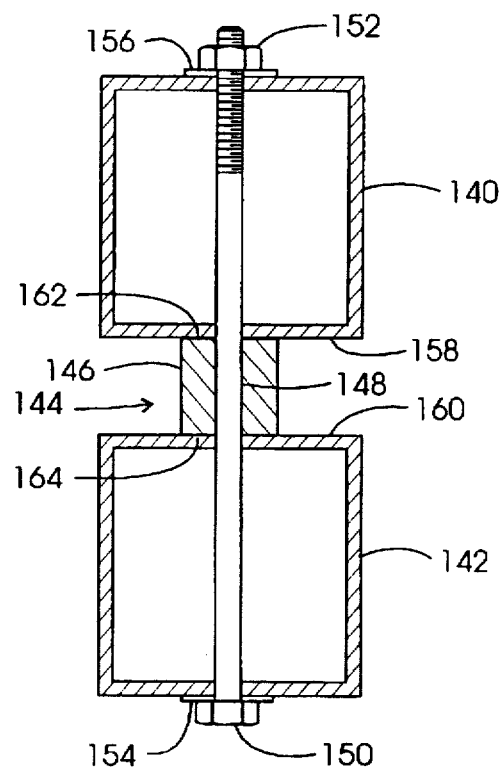
FIG. 5 is a sectional view showing the utilization of the invention in connection with sign post components of box beam configuration.

Referring to FIG. 5, the stress transfer bar based splicing arrangement is shown employed in conjunction with box beam sign post components having a square cross-sectional configuration. In this regard, a lower component represented at 140 is provided which is positioned in anchoring relationship with the terrain. The lower component 140 will have regularly spaced linearly vertically oriented apertures as in case of the U-channel components. A corresponding upper component having a box beam configuration is shown at 142. As before, the component 142 will have regularly spaced vertically linearly oriented apertures formed therein for connection both with a sign as well as a break-away splice represented generally at 144. To form the splice, as before, a stress transfer bar 146 is employed having non-threaded, parallel fastener receiving channels formed therein with a predetermined specified vertical spacing. Each channel is provided as a bore 148. Lower component 140 and upper component 142 then are joined at the splice 144 by two break-away bolts, one of which is seen at 150. Bolt 150 is seen to extend through apertures formed in upper component 142, thence through fastener receiving channel 148, and through corresponding apertures within lower component 140. A nut 152 completes the assembly. Optionally, washers as at 154 and 156 may be employed at the splice 144. It may be observed that a connecting surface 158 is defined by one aperture containing surface of component 140 while a corresponding connecting surface 160 is defined at one aperture containing surface of upper component 142.

Stress transfer bar 146, as before, is configured having a contact surface 162 substantially in continuous contact with connecting surface 152 and a parallel, oppositely disposed contact surface 164 in similar engagement with connecting surface 160. This assures appropriate transfer of torsional stresses and the like from the upper component 142 to the lower component 140 and, importantly, insures a correct vertical spacing of the two bolts employed, one of which is shown at 150.

Figure 6:
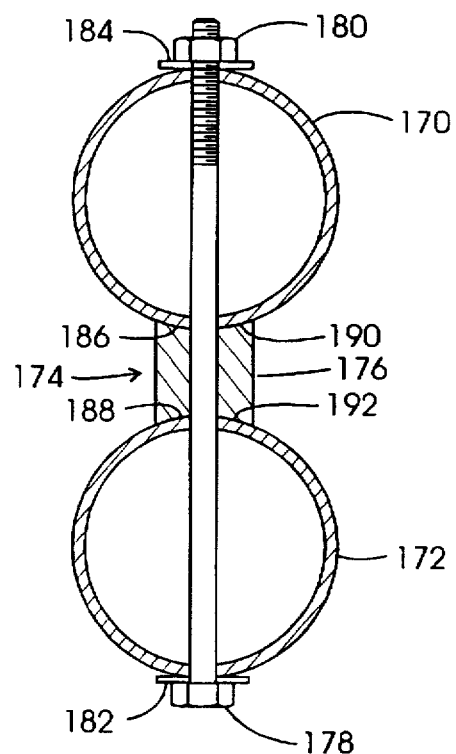
FIG. 6 is a sectional view of another embodiment of the invention showing a splicing arrangement employed with a sign post of pipe configuration.

Referring to FIG. 6, an implementation of the spliced sign post using pipe components is illustrated. A lower component is represented in the figure at 170. This component 170 will be positioned and anchored within the terrain and will have a longitudinal, regularly spaced sequence of apertures extending through it. The upper component of the sign post is represented at 172 and also will have the same type of linearly disposed, regularly spaced apertures generally extending along its length. The lower portion of upper component 172 and the upper, exposed portion of lower component 170 are spliced as represented in general at 174 with the utilization of an elongate stress transfer bar 176. Bar 176 is relatively elongate, having two parallel fastener receiving channels present as bores at a mutual spacing which is predetermined or pre-specified. These channels dictate or mandate the vertical spacing of fasteners such as elongate bolts, one of which is shown at 178 in association with a nut 180 and washers 182 and 184. With the arrangement shown, a connecting surface 186 is defined adjacent the aperture of component 170, while a corresponding connecting surface 188 is disposed along the linear aperture grouping of upper component 172. To provide substantially continuous contact between these surface 186 and 188, and corresponding connecting surfaces of the stress transfer bar 176, the connecting surface as at 190 of transfer bar 176 is machined or radiused in correspondence with the radius of the outside surface of pipe component 170. Similarly, the connecting surface 192 which is oppositely disposed from surface 190 is concavely radiused in correspondence with the radius of the outer surface of upper pipe component 172. Accordingly, the spacing of two as at 178 is mandated with the arrangement and a structurally more secure splice 174 is achieved to improve the integrity of the break-away feature of the signpost.

Since certain changes may be made in the above-described apparatus and method without departing from the scope of the invention herein involved, it is intended that all matter contained in the description thereof or shown in the accompanying drawings shall be interpreted as illustrative and not in a limiting sense.

I claim:

1. A signpost, comprising:

a lower support component for anchoring positioning below a surface of terrain and having an upper portion for extension a predetermined distance above said surface with a first connecting surface of predetermined first widthwise configuration having apertures therein longitudinally spaced apart a predetermined spacing distance;

an upper support component having an upper end for supporting connection with a sign and a lower end with a second connecting surface of second predetermined widthwise configuration having apertures therein spaced apart said predetermined spacing distance;

a stress transfer bar having a widthwise extent corresponding with one said predetermined first and second widthwise configuration to define contact surfaces, spaced apart a thickness dimension, each being positionable in substantially continuous stress transferring contact with one said first and second connecting surface, said transfer bar having two parallel fastener receiving channels extending normally to said contact surfaces and spaced longitudinally apart along the length of said stress transfer bar a predetermined integer multiple of said predetermined spacing distance selected to structurally retain said upper support component upon said lower support component in the presence of wind loads upon said sign;

first and second fasteners exhibiting predetermined tensile breakaway characteristics, each extending through one said receiving channel, retaining said first and second connecting surfaces in abutment against said contact surfaces; and a flexible run-away strap having one end bolted to said lower support component upper portion, an opposite end bolted to said upper component lower end, and having a coiled intermediately disposed storage portion of predetermined length.

2. A signpost, comprising:

a lower support component for anchoring positioning below a surface of terrain and having an upper portion for extension a predetermined distance above said surface with a first connecting surface of predetermined first widthwise configuration having apertures therein longitudinally spaced apart a predetermined spacing distance;

an upper support component having an upper end for supporting connection with a sign and a lower end with a second connecting surface of second predetermined widthwise configuration having apertures therein spaced apart said predetermined spacing distance;

a stress transfer bar having a widthwise extent corresponding with one said predetermined first and second widthwise configuration to define contact surfaces, spaced apart a thickness dimension, each being positionable in substantially continuous stress transferring contact with one said first and second connecting surface, said transfer bar having two parallel fastener receiving channels provided as tapped bores extending normally to said contact surfaces and spaced longitudinally apart along the length of said stress transfer bar a predetermined integer multiple of said predetermined spacing distance selected to structurally retain said upper support component upon said lower support component in the presence of wind loads upon said sign; and first and second threaded bolt fasteners exhibiting predetermined tensile breakaway characteristics, each extending in threaded engagement through one said receiving channel, retaining said first and second connecting surfaces in abutment against said contact surfaces.

3. A signpost, comprising:

a lower support pipe component for anchoring positioning below a surface of terrain and having an upper portion for extension a predetermined distance above said surface with a first connecting surface of given radius having apertures therein longitudinally spaced apart a predetermined spacing distance;

an upper support pipe component having an upper end for supporting connection with a sign and a lower end with a second connecting surface of given radius having apertures therein spaced apart said predetermined spacing distance;

a stress transfer bar having a predetermined widthwise extent to define contact surfaces of concave cylindrical configuration having radii corresponding with said given radius, spaced apart a thickness dimension, each being positionable in substantially continuous stress transferring contact with one said first and second connecting surface, said transfer bar having two parallel fastener receiving channels extending normally to said contact surfaces and spaced longitudinally apart along the length of said stress transfer bar a predetermined integer multiple of said predetermined spacing distance selected to structurally retain said upper support component upon said lower support component in the presence of wind loads upon said sign; and first and second fasteners exhibiting predetermined tensile breakaway characteristics, each extending through one said receiving channel, retaining said first and second connecting surfaces in abutment against said contact surfaces.

* * * * *